United States Patent
Tsubokura et al.

(10) Patent No.: US 6,706,278 B1
(45) Date of Patent: Mar. 16, 2004

(54) PIGMENT-CONTAINING MATERIALS TO BE ADDED TO FEEDS

(75) Inventors: Akira Tsubokura, Kanagawa (JP); Hisashi Yoneda, Kanagawa (JP); Haruyoshi Mizuta, Kanagawa (JP)

(73) Assignee: Nippon Mitsubishi Oil Corporation, Tokyo (JP)

(*) Notice: Subject to any disclaimer, the term of this patent is extended or adjusted under 35 U.S.C. 154(b) by 67 days.

(21) Appl. No.: 09/856,640

(22) PCT Filed: Sep. 22, 2000

(86) PCT No.: PCT/JP00/06528

§ 371 (c)(1),
(2), (4) Date: May 23, 2001

(87) PCT Pub. No.: WO01/22833

PCT Pub. Date: Apr. 5, 2001

(30) Foreign Application Priority Data

Sep. 30, 1999 (JP) .............................. 11-279337

(51) Int. Cl.$^7$ .......................... C12P 23/00; C12N 1/12; A23K 1/17

(52) U.S. Cl. ................. 424/442; 435/67; 435/252.1

(58) Field of Search .............................. 424/442; 435/67, 435/252.1

(56) References Cited

U.S. PATENT DOCUMENTS 5,607,839 A * 3/1997 Tsubokura et al.

FOREIGN PATENT DOCUMENTS

| EP | 0 454 024 | 10/1991 |
| EP | 0 747 483 | 12/1996 |
| EP | 0 635 576 | 8/2000 |
| JP | 05-328979 | 12/1993 |
| JP | 06-165684 | 6/1994 |
| JP | 09-308481 | 12/1997 |

* cited by examiner

Primary Examiner—Sandra Saucier
(74) Attorney, Agent, or Firm—Heller Ehrman White and McAuliffe

(57) ABSTRACT

This invention provides a pigment-containing substance for feed additives consisting of a microorganism culture precipitate which contains a high concentration of carotenoid compounds. This pigment-containing substance for feed additives is resistant to oxygen, light and so on, and can be stably conserved for a long time period.

7 Claims, No Drawings

PIGMENT-CONTAINING MATERIALS TO BE ADDED TO FEEDS

TECHNICAL FIELD

The present invention relates to a pigment-containing substance for feed additives consisting of a microorganism culture precipitate which contains carotenoid compounds.

BACKGROUND ART

"Carotenoid compounds" is a generic name for a group of pigment which have a long-chain polyene structure, the majority of which have a C40 tetraterpenoid, and present yellow, orange, red or purple color. More specifically it refers to the compounds such as β-carotene, astaxanthin, canthaxanthin, zeaxanthin, echinenone, adonirubin and adonixanthin. These compounds can be used as natural pigments useful for feed additives, food additives, pharmaceuticals etc. For example, astaxanthin is valuable from an industrial point of view as a feed additive such as a color improver for bred fishes such as salmon, trout, red sea bream etc., and also as a safe natural food additive. Adonixanthin is as promising as astaxanthin, as a feed additive, a food additive and pharmaceutical as the astaxanthin is, if its industrial production process can be established. Canthaxanthin has been used as a feed additive, food additive, cosmetic, etc., and zeaxanthin has been used as a feed additive and food additive. Further, echinenone and adonirubin also expected to be used as feed additives, food additives etc. As production processes for these carotenoid compounds, chemical synthesis, production by microorganisms, extraction from natural products etc. are known, and regarding astaxanthin and canthaxanthin, their chemical synthetic products are already on sale. Comparing with a chemical synthesis, the production process of carotenoid compounds by microorganisms is advantageous due to the high level of safety, since neither metal catalysts nor solvents are used therein. Generally, carotenoid compounds are unstable in the presence of oxygen and light. However, since carotenoid compounds produced by microorganisms are accumulated inside the cell of a microorganism, their stability is ensured by the cell membrane, cell wall and other antioxidants. When carotenoid compounds are used as feed additives or the like, a high level of storage stability is an advantage, and if the microorganism itself can be used, this would be a great advantage. In contrast, if intercellular carotenoid compounds are used after being extracted and purified, it is necessary to used chlorine-containing solvents or the like which may be unsafe. Accordingly, the use of a microorganism culture precipitate consisting of a microorganism which contain carotenoid compounds as a feed additive has a great advantage. In the case where the microorganism producing carotenoid compounds has a hard cell wall, the absorption efficiency is extremely low if a natural cell is provided. So the cell should be disrupted mechanically or decomposed with chemical agents or enzymes, and this leads to a cost disadvantage. In addition, there is a problem that the stability of carotenoid compounds decreases after the cell is disrupted. Furthermore, when the content of carotenoid compounds existing in a microorganism culture precipitate is low, a large mount of precipitate is needed in the production process of the feed, and this causes other problems such as poor operability, high transport cost and nutritional inbalance of the feed. However, there is not known a pigment-containing substance consisting of a microorganism whose lack of a hard cell wall allows easy use of the accumulated carotenoid compounds; and, further consisting of a microorganism culture precipitate which contains at least 3 mass % carotenoid compounds.

Among carotenoid compounds, astaxanthin is a red pigment contained in Pisces such as salmon, trout, red sea bream etc., and Crustacea such as shrimps, crabs, etc., and it is useful because of its beautiful color, and as stated above, it has been broadly used as a feed additive and a natural food additive. Regarding the red yeast *Phaffia rhodozyma*, which is known to produce astaxanthin, there is a problem that, being a yeast, it has a hard cell wall. As processes for the production of astaxanthin by bacteria, the followings are known, but regarding each of them, the content per weight of dry cell is low: a bacterium *Brevibacterium* No.103 strain belonging to the genus *Brevibacterium* produces merely 0.003% of astaxanthin per weight of dry cell (*Journal of General and Applied Microbiology*, 15, 127, 1969). Also, another bacterium *Paracoccus marcusii* DSM11574 strain belonging to the genus *Paracoccus* produces only 0.022% of astaxanthin per weight of dry cell (WO 99/6586).

The object of the present invention is to provide a pigment-containing substance for feed additives consisting of a microorganism culture precipitate which contains a high concentration of carotenoid compounds useful as a natural pigment.

DISCLOSURE OF THE INVENTION

In order to achieve the above object, the present invention provides the following means.

1. A pigment-containing substance for feed additives comprising a microorganism culture precipitate which contains at least 3 mass % carotenoid compounds.
2. The pigment-containing substance for feed additives, characterized in that at least 40 mass % of the carotenoid compounds is astaxanthin.
3. The pigment-containing substance for feed additives, characterized in that a DNA nucleotide sequence corresponding to 16S ribosomal RNA of the microorganism in the microorganism culture precipitate has at least 98% homology with the nucleotide sequence shown in SEQ ID NO: 1.
4. The pigment-containing substance for feed additives, characterized in that the microorganism in the microorganism culture precipitate is E-396 strain or a mutant, thereof.

This specification includes part or all of the contents disclosed in the specification of Japanese Patent Application No. 11-279337, which is a priority document of the present application.

The present invention is described more specifically as follows.

The pigment-containing substance for feed additives of the present invention comprises a microorganism culture precipitate. First, the microorganism culture precipitate is disclosed. The microorganism culture precipitate of the present invention can be obtained by a process wherein mainly the cell of microorganism producing carotenoid compounds is cultured to produce these compounds, the resulting culture is treated by filtration, centrifugation etc., followed by the removal of a certain amount of moisture. Any method for culturing a strain which produces carotenoid compounds can be used on the condition that carotenoid compounds are generated. For example, the following method can be adapted. As a medium, one which contains the followings is used: carbon sources, nitrogen sources, inorganic salt, which are necessary for the growth of bacteria producing carotenoid compounds, and particularly required substances (e.g. vitamins, amino acids, nucleic acid bases etc.) as needed. The carbon sources to be used include carbohydrate such as glucose, sucrose, fructose, trehalose, mannose, mannitol and maltose; organic acids such as acetic acid, fumaric acid, citric acid, propionic acid, malic acid and malonic acid; alcohols such as ethanol, propanol, butanol, pentanol, hexanol and isobutanol; and the like. The ratio of added carbon sources depends on the type of carbon sources, but generally 1 to 100 g per L of medium, preferably 2 to 50 g is applied. The nitrogen sources to be used include one or more selected from potassium nitrate, ammonium nitrate, ammonium chloride, ammonium sulfate, diammonium hydrogen phosphate, ammonia, urea and the like. The ratio of added nitrogen sources depends on the type of nitrogen sources, but generally 0.1 to 10 g per L of medium, preferably 1 to 3 g is applied. The inorganic salt to be used includes one or more selected from potassium dihydrogen phosphate, dipotassium hydrogen phosphate, disodium phosphate, magnesium sulfate, magnesium chloride, ferrous sulfate, ferrous chloride, manganous sulfate, manganous chloride, zinc sulfate, zinc chloride, cupric sulfate, calcium chloride, calcium carbonate, sodium carbonate and the like. The ratio of added inorganic salt depends on the type of inorganic salt, but generally 0.001 to 10 g per L of medium are applied. The particularly required substances to be used include one or more selected from vitamins, nucleic acids, yeast extract, peptone, meat extract, malt extract, corn steep liquor, dry yeast, soybean cake, soybean oil, olive oil, corn oil, linseed oil and the like. The ratio of added particularly required substances depends on the type of the substances, but generally 1 to 200 g per L of medium, preferably 10 to 100 g is applied. The pH of the medium is 2–12, preferably it is adjusted to 6–10. As culture conditions, a shaking culture or an aeration agitation culture is carried out at 15–80° C., preferably at 20–35° C., ordinarily for 1–20 days, preferably for 2–8 days.

Next, moisture is removed from the culture obtained by the above method. The amount of moisture removed to obtain the pigment-containing substance for feed additives of the present invention depends on the state of the cultured medium (e.g. pigment content), but as a general process, first filtration is carried out, and when removal of moisture is further needed, drying of the precipitate follows. The methods of filtration include ordinary filtration, centrifugation and the like. Since the obtained precipitate contains water and precipitate comprising dessolved medium ingredients such as saline and carbohydrate, it is effective that water is added to the precipitate removed from the cultured medium, suspended, and then the precipitate is separate the precipitate again, so that the amount of carotenoid compounds therein increases. By this process, the medium ingredients dissolved in water can be removed to some extent. In the case where the amount of carotenoid compounds should be increased, it is possible to apply a method for removing moisture by drying the precipitate. The methods for drying the precipitate include ordinary spray drying, drum drying, freeze drying and the like.

The microorganism culture precipitate obtained by the above method can be used successfully as a pigment-containing substance. For the purpose of preventing the decomposition of carotenoid compounds, antioxidants such as BHT (butylated hydroxytoluene), ethoxyquin and vitamin E may be added to the culture precipitate. Further, the surface of the microorganism may be covered with gelatin or the like.

Now, the microorganism used for the present invention is described. The microorganism used for the present invention is not specifically limited so long as it can produce carotenoid compounds by the culture of microorganisms such as bacteria and yeast, and can contain at least 3 mass % carotenoid compounds in its culture precipitate. However, considering the use of carotenoid compounds accumulated in the microorganism during the culture, it is preferable to employ a bacterium whose cell wall is thin enough to utilize the pigment effectively. In view of the growth speed and productivity of carotenoid compounds, it is especially preferable that a DNA nucleotide sequence corresponding to 16S ribosomal RNA is substantially homologous with the nucleotide sequence shown in SEQ ID NO: 1.

Taking the frequency of occurrence of errors in determining DNA nucleotide sequence into consideration, the term "substantially homologous" used herein means at least 98% homology.

In the bacteria having the sequence substantially homologous with the above sequence, carotenoid compounds such as astaxanthin, adonixanthin, β-carotene, echinenone, canthaxanthin, zeaxanthin, β-cryptoxanthin, 3-hydroxyechinenone, asteroidenone, adonirubin are accumulated by culture as a mixture. The ratio of generated carotenoid compounds contained in the cell can be changed, for example by changing aerobic culture conditions. By way of example, the ratio of generated adonixanthin can be changed by increasing the concentration of dissolved oxygen in culture medium. Also, the cell having an altered ratio of carotenoid compound production can be obtained by mutation. The methods of mutation include physical methods such as X-ray irradiation and ultraviolet ray irradiation, the use of chemical mutagens, and artificial mutations wherein a chemical method of mutation such as treatment with NTG (N-methyl-N'-nitoro-N-nitrosoguanidine) and EMS (ethylmethane sulfonate).

Among the said bacteria, E-396 strain is one wherein astaxanthin makes up at least 40 mass % of the generated carotenoid compounds. This strain was newly isolated by the present inventors, and was deposited with the National Institute of Bioscience and Human-Technology, Agency of Industrial Science and Technology (1 Higashi 1 chome, Tsukuba-shi, Ibaraki-ken, Japan) under accession No. FERM BP-4283 on Apr. 27, 1993. The mycological properties of this strain are disclosed in Japanese Patent Application Laying-Open (kokai) Nos. 7-79796, 8-9964 and 9-308481. A DNA nucleotide sequence corresponding to 16S ribosomal RNA of this strain is as shown in SEQ ID NO: 1.

Astaxanthin produced by the strain whose DNA nucleotide sequence corresponding to 16S ribosomal RNA is substantially homologous with the sequence specified by the present invention, is (3S, 3'S)-astaxanthin, and the purity is almost 100%. Astaxanthin presented in natural products such as crayfish, haematococuss, salmon, trout and red sea bream is known to contain a high rate of (3S, 3'S). In contrast, Phaffia rhodozyma is known to contain a high rate of (3R, 3'R) which has an absolute configuration which is the reverse of astaxanthin presented in the nature. The astaxanthin produced by the strain of the present invention is 100% (3S, 3'S)-astaxanthin and it is valuable from an industrial point of view that it has the same absolute configuration as the majority of astaxanthins in nature.

Some examples are provided below to describe the present invention more specifically, but the present invention is not limited thereto.

BEST MODES FOR CARRYING OUT THE INVENTION

Example 1

A medium 6 mL consihsting of the composition of Table 1 was put into a test tube whose diameter is 18 mm and a steam sterilization was carried out at 121° C. for 15 minutes. One platinum loop of E-396 strain (FERM BP-4283) was inoculated thereinto, and a reciprocal shaking culture was carried out at 350 rpm at 28° C. for 2 days. 2 mL of this culture was transferred to a 500 mL Sakaguchi flask containing 100 mL of the medium which has the same composition as the above, and a reciprocal shaking culture was carried out at 100 rpm at 28° C. for 6 days. Cells (wet weight 3.2 g) were obtained from 100 mL of the cultured medium by centrifugation. After the cells were added to 50 mL of ion-exchange water and fully suspended and centrifugation was carried out again to obtain cells (wet weight 3.1 g). Then, 3.1 g of the cells was freeze-dried to obtain 1.1 g of dried cell. The carotenoid content existing in the dried cell was analyzed by high-performance liquid chromatography. The composition of carotenoid compounds is shown in Table 2. The water content in the dried cell was 2.5%.

TABLE 1

| Composition | Added amount (g/L) |
| --- | --- |
| Yeast extract | 20 |
| Peptone | 5 |
| Sucrose | 100 |
| $KH_2PO_4$ | 1.5 |
| $Na_2HPO_4.12H_2O$ | 3.8 |
| $MgSO_4.7H_2O$ | 0.5 |
| $FeSO_4.7H_2O$ | 0.01 |
| $CaCl_2.2H_2O$ | 0.01 |
| pH7 (adjusted to this value using $Na_2CO_3$) | |

TABLE 2

| Carotenoid compounds | Content (mg/g) |
| --- | --- |
| β-carotene | 1.6 |
| echinenone | 1.9 |
| 3-hydroxyechinenone | 0.9 |
| canthaxanthin | 2.3 |
| adonirubin | 5.6 |
| astaxanthin | 13.0 |
| asteroidenone | 0.6 |
| adonixanthin | 5.3 |
| zeaxanthin | 0.01 |
| total carotenoid | 31.2 |

Example 2

E-396 strain (FERM BPA4283) was mutated with NTG (N-methyl-N'-nitoro-N-nitrosoguanidine) and intensely red colored colonies were selected. Carotenoid compounds in the cultured medium were analyzed, and mutant strains with increased astaxanthin yield were selected. The medium 5 mL consisting of the composition of Table 1 was put into a test tube whose diameter is 18 mm and a steam sterilization was carried out at 121° C. for 15 minutes. One platinum loop of the mutant E-396 strain was inoculated thereinto, and a reciprocal shaking culture was carried out at 300 rpm at 30° C. for 2 days. 2 mL of this culture was transferred to a 500 mL Sakaguchi flask containing 100 mL of the medium which has the same composition as the above, and a reciprocal shaking culture was carried out at 120 rpm at 29° C. for 2 days. Then, 800 mL of this culture was inoculated into a 30L fernenter containing 20L of the medium consisting of the composition of Table 3, and an aerobic fermentation was carried out at 400 rpm at 1.0 vm at 29° C. for 150 hours. Cells (wet weight 600 g) were obtained from 18L of the cultured medium by Sharples centrifuge. After the cells were added to 20L of tap water and fully suspended, cells (wet weight 530 g) were obtained by again using the same Sharples centrifuge. Then, after 1.5L of tap water was added and the cells (wet weight 530 g) were fully suspended, and the cell was dried with a spray drier to obtain 200 g of dried cell. As operating conditions, the air temperature was 210° C. when introduced and was 105° C. at exit, and the rate at which the suspension was fed was 38 mL/min. The carotenoid content existing in the dried cell was analyzed by high-performance liquid chromatography. The composition of carotenoid compounds is shown in Table 4. The water content in the dried cell was 3.1%.

TABLE 3

| Composition | Added amount (g/L) |
| --- | --- |
| Yeast extract | 20 |
| Peptone | 5 |
| glucose | 120 |
| $KH_2PO_4$ | 1.5 |
| $Na_2HPO_4.12H_2O$ | 3.8 |
| $MgSO_4.7H_2O$ | 0.5 |
| $FeSO_4.7H_2O$ | 0.01 |
| $CaCl_2.2H_2O$ | 0.01 |
| pH7 (adjusted to this value using $Na_2CO_3$) | |

TABLE 4

| Carotenoid compounds | Content (mg/g) |
| --- | --- |
| β-carotene | 0.7 |
| echinenone | 1.1 |
| 3-hydroxyechinenone | 0.6 |
| canthaxanthin | 1.7 |
| adonirubin | 5.4 |
| astaxanthin | 19.4 |
| asteroidenone | 0.8 |
| adonixanthin | 5.5 |
| zeaxanthin | 0.02 |
| total carotenoid | 35.2 |

ADVANTAGE OF THE INVENTION

Since the carotenoid existing in the pigment-containing substance for feed additives of the present invention is stabilized by the action of cell membrane, cell wall and the like of a rnicroorganism, the pigment-containing substance for feed additives is resistant to oxygen, light and so on, and can be stably stored for a long time period. All publications, patents and patent applications cited herein are incorporated herein by reference in their entirety.

What is claimed is:

1. A pigment-containing substance for inclusion as a feed additive produced by the method comprising:

culturing a microbe capable of producing carotenoid compounds;

centrifuging or filtering the microbial cells to remove the culture medium; and drying the cells so that at least 3% by mass of the dried microbial cells is carotenoid compounds.

2. The pigment-containing cellular substance for feed additives according to claim 1, wherein at least 40 mass % of the carotenoid compounds is astaxanthin.

3. The pigment-containing cellular substance for feed additives according to claim 1, wherein a DNA nucleotide sequence corresponding to 16S ribosomal RNA of the microbe has at least 98% homology with the nucleotide sequence as shown in SEQ ID NO:1.

4. The pigment-containing cellular substance for feed additives according to claim 3, wherein ther microbe is E-396 strain or a mutant thereof.

5. The pigment-containing cellular substance for feed additives according to claim 2, wherein a DNA nucleotide sequence corresponding to 16S ribosomal RNA of the at least 98% homology with the nucleotide sequence as shown in SEQ ID NO:1.

6. The pigment-containing cellular substance for feed additives according to claim 5, wherein the microbe E-396 strain or a mutant thereof.

7. A pigment-containing substance for inclusion as a feed additive produced by the method comprising:

culturing a microbe capable of 2producing carotenoid compounds;

centrifuging or filtering the microbial cells to remove the culture medium;

adding water to the cells;

suspending the cells in the water;

separating the water from the cells to remove dissolved medium ingredients; and drying the cells so that at least 3% by mass of the dried microbial cells is carotenoid compounds.

* * * * *

SEQUENCE LISTING

<160> NUMBER OF SEQ ID NOS: 1

<210> SEQ ID NO 1
<211> LENGTH: 1452
<212> TYPE: DNA
<213> ORGANISM: Unknown
<220> FEATURE:
<223> OTHER INFORMATION: DNA nucleotide sequence corresponding to 16S ribosomal RNA
<221> NAME/KEY: variation
<222> LOCATION: (1350)..(1350)
<223> OTHER INFORMATION: n is A or G or C or T

<400> SEQUENCE: 1

```
agtttgatcc tggctcagaa cgaacgctgg cggcaggctt aacacatgca agtcgagcga      60
gaccttcggg tctagcggcg gacgggtgag taacgcgtgg gaacgtgccc ttctctacgg     120
aatagccccg ggaaactggg agtaataccg tatacgccct ttgggggaaa gatttatcgg     180
agaaggatcg gcccgcgttg gattaggtag ttggtggggt aatggcccac caagccgacg     240
atccatagct ggtttgagag gatgatcagc cacactggga ctgagacacg gcccagactc     300
ctacgggagg cagcagtggg gaatcttaga caatggggc  aaccctgatc tagccatgcc     360
gcgtgagtga tgaaggcctt agggttgtaa agctctttca gctgggaaga taatgacggt     420
accagcagaa gaagccccgg ctaactccgt gccagcagcc gcggtaatac ggaggggggct    480 agcgttgttc ggaattactg ggcgtaaagc gcacgtaggc ggactggaaa gtcagaggtg     540
aaatcccagg gctcaacctt ggaactgcct ttgaaactat cagtctggag ttcgagagag     600
gtgagtggaa ttccgagtgt agaggtgaaa ttcgtagata ttcggaggaa caccagtggc    660
gaaggcggct cactggctcg atactgacgc tgaggtgcga aagcgtgggg agcaaacagg     720
attagatacc ctggtagtcc acgccgtaaa cgatgaatgc cagacgtcgg caagcatgct    780
tgtcggtgtc acacctaacg gattaagcat tccgcctggg gagtacggtc gcaagattaa    840
aactcaaagg aattgacggg ggcccgcaca agcggtggag catgtggttt aattcgaagc     900
aacgcgcaga accttaccaa cccttgacat ggcaggaccg ctggagagat tcagctttct     960
cgtaagagac ctgcacacag gtgctgcatg gctgtcgtca gctcgtgtcg tgagatgttc   1020
ggttaagtcc ggcaacgagc gcaacccacg tccctagttg ccagcaattc agttgggaac   1080
tctatggaaa ctgccgatga taagtcggag gaaggtgtgg atgacgtcaa gtcctcatgg   1140
gccttacggg ttgggctaca cacgtgctac aatggtggtg acagtgggtt aatccccaaa   1200
agccatctca gttcggattg tcctctgcaa ctcgagggca tgaagttgga atcgctagta   1260
atcgcggaac agcatgccgc ggtgaatacg ttcccgggcc ttgtacacac cgcccgtcac   1320
accatgggag ttggttctac ccgacgacgn tgcgctaacc ttcggggggc aggcggccac   1380
ggtaggatca gcgactgggg tgaagtcgta acaaggtagc cgtagggaa cctgcggctg    1440 gatcacctcc tt                                                       1452
```